United States Patent Office 2,806,894
Patented Sept. 17, 1957

2,806,894

DEPOLYMERISATION REACTIONS

Pierre Roland, St. Fons, France, assignor to Societe des Usines Chimiques Rhone-Poulenc, Paris, France, a corporation of France No Drawing. Application March 28, 1955,
Serial No. 497,447

Claims priority, application France April 1, 1954

11 Claims. (Cl. 260—669)

This invention is for improvements in or relating to depolymerisation reactions. More specifically it concerns the depolymerisation of 4-methyl-2:4-diphenyl-pent-2-ene to form α-methylstyrene.

It is known that α-methylstyrene is dimerised in the presence of acid reagents to form an unsaturated dimer which is 4-methyl-2:4-diphenyl-pent-2-ene and a saturated dimer, 1:1:3-trimethyl-3-phenylindan.

These dimerisation reactions can be very troublesome and it is technically desirable to provide a process by means of which the dimers can be reconverted into monomeric- α-methylstyrene. Heretofore, no method of depolymerising the unsaturated dimer has been known, and it is the object of the present invention to provide such a method.

According to the present invention a process for the depolymerisation of 4-methyl-2:4-diphenyl-pent-2-ene to form monomeric α-methylstyrene comprises heating 4-methyl-2:4-diphenyl-pent-2-ene in the presence of a phenol of high boiling point. Preferably the heat treatment is effected in the presence of a catalyst.

The action of the phenols appears to be quite specific. In fact, attempts to depolymerise this compounding by heating in the presence of other high-boiling liquids such as high-boiling isoparaffinic hydrocarbons or tricresyl phosphate, in the presence or absence of catalysts have failed to yield any useful result.

The depolymerisation process of the invention is conveniently effected by mixing the unsaturated dimer, or mixtures containing it, with the phenol and, if desired, adding the catalyst. The heat treatment is preferably effected at subatmospheric pressure, e. g. in the region of 40 mm. of mercury in the presence of a catalyst. The α-methylstyrene distils over and is recovered by condensation.

As high-boiling phenols there may be employed:

(a) Phenols substituted by one or more alkyl or cycloalkyl side chains, such as the butylphenols, amylphenols and cyclohexylphenols (b) Phenols containing two or more benzene nuclei, such as the phenylphenols, p:p′-dihydroxydiphenyldimethylmethane, cumylphenol and the cumylcresols, and (c) Phenols containing condensed aromatic nuclei, such as the naphthols.

The quantity of phenol to be added my vary within wide limits but equal weights of phenol and of dimer are advantageously employed.

Some of the phenols mentioned, such as cumylphenyl or cumylcresol, are decomposed during the conversion of the unsaturated dimer to form, for example, phenol (or cresol) and α-methylstyrene. They are readily regenerated by the known methods, such as condensation of the phenol (or cresol) with α-methylstyrene or with phenyldimethyl-carbinol in the presence of acid catalysts.

When no catalyst is employed the mixture is preferably heated to a temperature in the neighbourhood of 280–300° C., while the presence of catalysts renders it possible to reduce the temperature e. g. 180–220° C. The phenol employed should have a boiling point making it convenient for use at the temperature or pressure selected.

The catalysts employed are preferably alkali metal acid sulphates or copper sulphate. Zinc sulphate and manganese sulphate may also be used, but generally do not give such good yields. It is also possible to use such catalysts as concentrated sulphuric acid and catalysts of the Friedel and Crafts type, such as aluminium chloride and ferric chloride, or activated earths, but these substances promote the dimerisation of the α-methylstyrene into trimethylphenyl indan, and are consequently less advantageous than the preferred catalysts indicated above.

The following examples illustrate the invention; the parts stated are by weight.

Example I

Into a vessel provided at the top with a column and an ordinary condenser are introduced 4-methyl-2:4-diphenyl-pent-2-ene (255 parts) and o-phenyl-phenol (255 parts). The mixture is heated to 285°–305° C. A slow depolymerization occurs and after 5 hours of heating α-methylstyrene (130–150 parts) is recovered. Yield—50–60%.

Example II

Proceeding as in Example I, but replacing o-phenylphenol by p-cumyphenol a mixture of α-methylstyrene and phenol is obtained, the cumylphenol having split in the process into α-methylstyrene and phenol.

Example III

This process is carried out as in Example I but in addition employing a catalyst. o-Phenylphenol (485 parts), 4-methyl-2:4-diphenyl-pent-2-ene (500 parts) and copper sulphate ($CuSO_4.5H_2O$; 20 parts) are heated to 185°–200° C. under a vacuum of 40 mm. of mercury. 350 parts of o-methylstyrene are recovered. Yield—70%.

If in the process of this Example the o-phenylphenol is replaced by tricresyl phosphate or by an isoparaffinic hydrocarbon boiling at 300° C., no splitting of the 4-methyl-2:4-diphenyl-pent-2-ene is observed, even in the presence of copper sulphate as catalyst, under the same conditions of temperature and pressure. Likewise if 4-methyl-2:4-diphenyl-pent-2-ene is heated under the same conditions of temperature and pressure in the presence of copper sulphate but in the absence of high-boiling phenol, no splitting into α-methylstyrene is observed.

Example IV

A crude product containing 88% of 4-methyl-2:4-diphenyl-pent-2-ene (505 parts), p-cumylphenol (525 parts) and copper sulphate ($CuSO_4.5H_2O$; 50 parts) is introduced into a reaction vessel as in Example I and the mixture heated to 185°–200° C. under 35–37 mm. of mercury. 998 parts of distillate are recovered. The distillate is fractionated and α-methylstyrene (655 parts; B. $P_{.10\ mm.}$ 48° C.) and phenol (200 parts) are obtained. The α-methylstyrene yield, which emanates both from the 4-methyl-2:4-diphenyl-pent-2-ene and from the p-cumylphenol, is 90.6% calculated on the sum of the two reagents employed.

Example V

A mixture of a crude product containing 87.7% of 4-methyl-2:4-diphenyl-pent-2-ene (500 parts), cumylphenol (500 parts) and potassium hydrogen sulphate (30 parts) are heated to 200° C. under 40 mm. of mercury, and α-methylstyrene is recovered in a yield of 96% on the sum of the 4-methyl-2:4-diphenyl-pent-2-ene and cumylphenol introduced.

If in the process of this example 4-methyl-2:4-diphenyl-pent-2-ene is heated in the presence of cumylphenol but using sulphuric acid instead of potassium hydrogen sulphate, a splitting occurs but the yield of α-methylstyrene is only 19.7% (calculated on the sum of the 4-methyl-2:4-diphenyl-pent-2-ene and the cumylphenol), the greater part of the 4-methyl-2:4-diphenyl-pent-2-ene being cyclised into the saturated dimer, i. e. trimethylphenylindan.

*Example VI*

A product containing 92.5% of 4-methyl-2:4-diphenyl-pent-2-ene (250 parts), β-naphthol (250 parts) and copper sulphate (CuSO$_4$.5H$_2$O; 25 parts) is heated to 190°–200° C. under 40 mm. of mercury. α-Methylstyrene (191 parts) is obtained, corresponding to a yield of 82%.

*Example VII*

The process of Example VI is employed, but the β-naphthol is replaced by cyclohexylphenol. α-Methylstyrene is obtained in a yield of 97.9%.

I claim:

1. A process for the depolymerisation of 4-methyl-2:4-diphenyl-pent-2-ene to form α-methylstyrene which comprises heating 4-methyl-2:4-diphenyl-pent-2-ene in solution in a phenol of boiling point at least 220° C.

2. A process for the depolymerisation of 4-methyl-2:4-diphenyl-pent-2-ene to form monomeric α-methylstyrene which comprises heating 4-methyl-2:4-diphenyl-pent-2-ene in solution in o-phenyl phenol.

3. A process for the depolymerisation of 4-methyl-2:4-diphenyl-pent-2-ene to form monomeric α-methylstyrene which comprises heating 4-methyl-2:4-diphenyl-pent-2-ene in solution in p-cumyl phenol.

4. A process for the depolymerisation of 4-methyl-2:4-diphenyl-pent-2-ene to form monomeric α-methylstyrene which comprises heating at subatmospheric pressure 4-methyl-2:4-diphenyl-pent-2-ene in solution in o-phenylphenol and a catalyst selected from the class consisting of copper sulphate and alkali metal acid sulphates.

5. A process for the depolymerisation of 4-methyl-2:4-diphenyl-pent-2-ene to form monomeric α-methylstyrene which comprises heating at subatmospheric pressure 4-methyl-2:4-diphenyl-pent-2-ene in solution in p-cumyl phenol and a catalyst selected from the class consisting of copper sulphate and alkali metal acid sulphates.

6. A process for the depolymerisation of 4-methyl-2:4-diphenyl-pent-2-ene to form α-methylstyrene which comprises heating at 280°–300° 4-methyl-2:4-diphenyl-pent-2-ene in solution in a phenol of boiling point at least 220° C.

7. A process for the depolymerisation of 4-methyl-2:4-diphenyl-pent-2-ene to form α-methylstyrene which comprises heating 4-methyl-2:4-diphenyl-pent-2-ene in solution in a phenol of boiling point at least 220° C. and a catalyst selected from the group consisting of copper sulphate and alkali metal acid sulphates.

8. A process for the depolymerisation of 4-methyl-2:4-diphenyl-pent-2-ene to form α-methylstyrene which comprises heating at a temperature of at least 180° C. and under subatmospheric pressure 4-methyl-2:4-diphenyl-pent-2-ene in solution in a phenol of boiling point at least 220° C. and a catalyst selected from the group consisting of copper sulphate and alkali metal acid sulphates.

9. A process for the depolymerisation of 4-methyl-2:4-diphenyl-pent-2-ene to form α-methylstyrene which comprises heating at a temperature of at least 180° C. and a pressure in the region of 40 mm. mercury 4-methyl-2:4-diphenyl-pent-2-ene in solution in a phenol of boiling point at least 220° C. and a catalyst selected from the group consisting of copper sulphate and alkali metal acid sulphates.

10. A process for the depolymerisation of 4-methyl-2:4-diphenyl-pent-2-ene to form monomeric α-methylstyrene which comprises heating 4-methyl-2:4-diphenyl-pent-2-ene in solution in β-naphthol.

11. A process for the depolymerisation of 4-methyl-2:4-diphenyl-pent-2-ene to form monomeric α-methylstyrene which comprises heating 4-methyl-2:4-diphenyl-pent-2-ene in solution in cyclohexyl-phenol.

References Cited in the file of this patent

UNITED STATES PATENTS

| | | |
|---|---|---|
| 2,372,528 | Soday | Mar. 27, 1945 |
| 2,383,921 | Soday | Aug. 28, 1945 |
| 2,389,793 | Livingston | Nov. 27, 1945 |

OTHER REFERENCES

Berkman et al.: "Catalysis," Reinhold Publishing Corp., N. Y. (1940), page 978 relied on.